United States Patent
Chambers et al.

(10) Patent No.: US 9,671,936 B2
(45) Date of Patent: Jun. 6, 2017

(54) SYSTEM AND METHODS FOR INTERACTING WITH A CONTROL ENVIRONMENT

(71) Applicant: UNIVERSAL ELECTRONICS INC., Santa Ana, CA (US)

(72) Inventors: Christopher Chambers, Stanton, CA (US); Wayne Scott, Newport Beach, CA (US); Cheryl Scott, Newport Beach, CA (US); Allen Yuh, Diamond Bar, CA (US); Paul D. Arling, Irvine, CA (US)

(73) Assignee: Universal Electronics Inc., Santa Ana, CA (US)

( * ) Notice: Subject to any disclaimer, the term of this patent is extended or adjusted under 35 U.S.C. 154(b) by 282 days.

(21) Appl. No.: 14/629,880

(22) Filed: Feb. 24, 2015

(65) Prior Publication Data
US 2015/0301709 A1   Oct. 22, 2015

Related U.S. Application Data

(60) Continuation of application No. 11/888,238, filed on Jul. 31, 2007, now Pat. No. 8,997,020, which is a
(Continued)

(51) Int. Cl.
*G06F 3/0484*  (2013.01)
*G06F 3/0485*  (2013.01)
(Continued)

(52) U.S. Cl.
CPC .......... *G06F 3/0484* (2013.01); *G06F 3/0481* (2013.01); *G06F 3/0485* (2013.01);
(Continued)

(58) Field of Classification Search
CPC .................................................. G06F 3/0484
(Continued)

(56) References Cited

U.S. PATENT DOCUMENTS

| | | | |
|---|---|---|---|
| 6,867,764 B2* | 3/2005 | Ludtke | G06F 3/04883 345/173 |
| 8,010,157 B1* | 8/2011 | Fujisaki | H04M 1/575 455/12.1 |

(Continued)

OTHER PUBLICATIONS

"Handbook for the palm Tungsten E Handheld" manufactured by Palm, Inc. released on Oct. 2003, 11 Pages.*

*Primary Examiner* — Reza Nabi
(74) *Attorney, Agent, or Firm* — Greenberg Traurig, LLP

(57) ABSTRACT

A system and methods for facilitation of user interactions with an electronic device. A number of user interface methods are described and may be used alone or in combination with one another to present an enhanced interface to a user. A method of providing user interaction using a compact status indicator is described. A method for providing a virtual scroll wheel to a user for interaction with content sets is described. A method for allowing a user to dynamically modify a scalable user interface is described. A method for providing gesture based input to a user via a virtual gesture pad is described. A method of providing an interactive graphic search query interface is described. A method for indicating and selecting available content type is described.

16 Claims, 12 Drawing Sheets

Related U.S. Application Data division of application No. 11/025,216, filed on Dec. 29, 2004, now abandoned, application No. 14/629,880, which is a continuation-in-part of application No. 10/288,727, filed on Nov. 6, 2002, now Pat. No. 7,831,930, and a continuation-in-part of application No. 10/287,389, filed on Nov. 4, 2002, now abandoned, and a continuation-in-part of application No. 09/905,396, filed on Jul. 13, 2001, now Pat. No. 6,938,101.

(60) Provisional application No. 60/534,608, filed on Jan. 6, 2004.

(51) Int. Cl.
*G06F 3/0488* (2013.01)
*G06F 3/0481* (2013.01)
*G06F 3/0486* (2013.01)

(52) U.S. Cl.
CPC ........ *G06F 3/0486* (2013.01); *G06F 3/04883* (2013.01); *G06F 2203/04807* (2013.01)

(58) Field of Classification Search
USPC .......................................................... 715/835
See application file for complete search history.

(56) References Cited

U.S. PATENT DOCUMENTS

| | | | | |
|---|---|---|---|---|
| 8,694,910 | B2* | 4/2014 | Lambourne | G06F 3/0482 715/712 |
| 8,719,369 | B1* | 5/2014 | Brown | H04M 3/42161 379/88.16 |
| 2002/0143805 | A1* | 10/2002 | Hayes | G06F 1/1626 345/169 |
| 2003/0103088 | A1* | 6/2003 | Dresti | G06F 3/0481 715/835 |
| 2003/0105820 | A1* | 6/2003 | Haims | G06Q 10/10 709/205 |
| 2003/0117427 | A1* | 6/2003 | Haughawout | G01C 21/3682 715/710 |
| 2004/0064510 | A1* | 4/2004 | Ooi | H04L 12/1822 709/205 |
| 2007/0150830 | A1* | 6/2007 | Ording | G06F 3/0481 715/784 |
| 2007/0236475 | A1* | 10/2007 | Wherry | G06F 3/0485 345/173 |
| 2008/0025529 | A1* | 1/2008 | Keohane | G06F 3/165 381/104 |
| 2008/0062141 | A1* | 3/2008 | Chandhri | G06F 3/0482 345/173 |
| 2008/0134078 | A1* | 6/2008 | Han | G06F 3/04883 715/784 |
| 2008/0180301 | A1* | 7/2008 | Aaron | G06F 3/014 341/176 |
| 2008/0211785 | A1* | 9/2008 | Hotelling | G06F 3/0418 345/173 |
| 2009/0265658 | A1* | 10/2009 | Klishko | G06F 3/0416 715/786 |
| 2010/0156806 | A1* | 6/2010 | Stallings | G06F 3/04883 345/173 |
| 2010/0315438 | A1* | 12/2010 | Horodezky | G06F 3/0481 345/661 |
| 2011/0057953 | A1* | 3/2011 | Horodezky | G06F 3/04883 345/647 |
| 2014/0218343 | A1* | 8/2014 | Hicks | G06F 3/033 345/179 |
| 2015/0301709 | A1* | 10/2015 | Chambers | G06F 3/0485 715/716 |
| 2016/0080887 | A1* | 3/2016 | Tikkanen | H04R 5/04 381/303 |
| 2016/0124568 | A1* | 5/2016 | Heim | G06F 3/04883 345/174 |

* cited by examiner

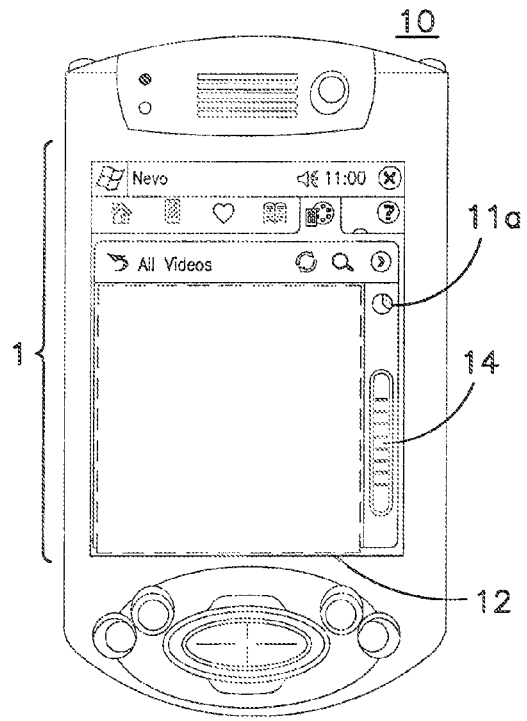
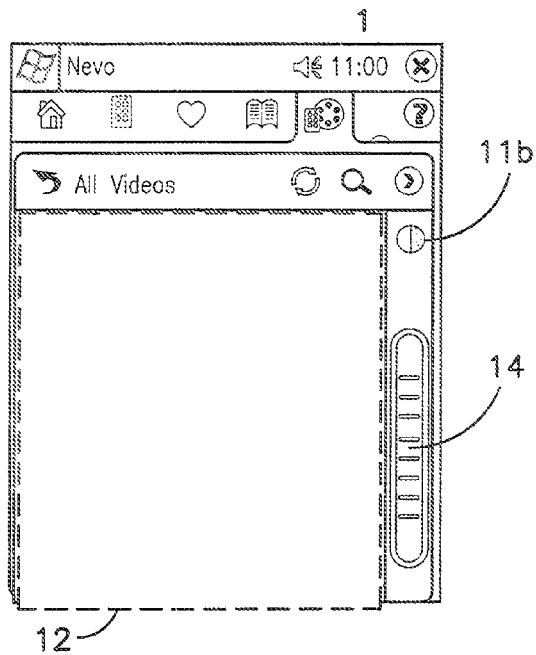
FIG. 4    FIG. 5
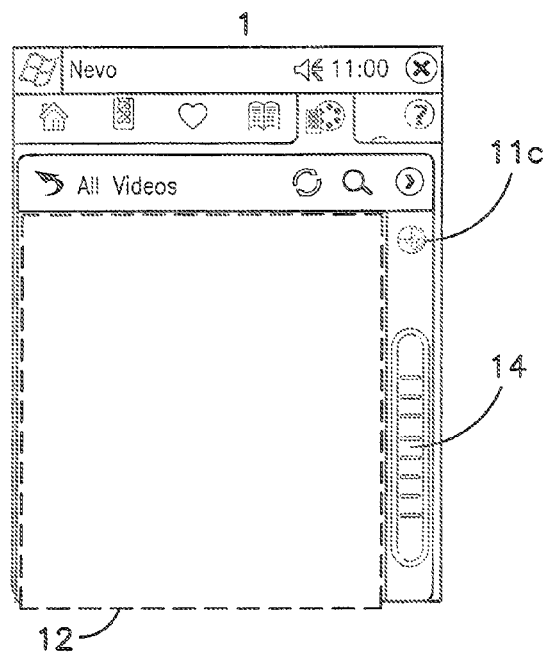
FIG. 6

SYSTEM AND METHODS FOR INTERACTING WITH A CONTROL ENVIRONMENT

RELATED APPLICATION INFORMATION

This application is a continuation of U.S. application Ser. No. 11/888,238, filed on Jul. 31, 2007, which application, in turn, claims the benefit of and is a Divisional of U.S. application Ser. No. 11/025,216, filed on Dec. 29, 2004.

Through U.S. application Ser. No. 11/025,216, this application claims the benefit of U.S. Provisional Application Ser. No. 60/534,608, filed on Jan. 6, 2004, and, as a continuation-in-part application, the benefit of U.S. Published Patent Applications Nos. 2003/0103088, filed on Nov. 6, 2002, 2003/0117427, filed on Nov. 4, 2002, and 2002/0143805, filed Jul. 13, 2001.

All of these prior applications are incorporated herein by reference in their entirety.

BACKGROUND OF THE INVENTION

This invention relates generally to user interfaces for electronic devices. Exemplary devices include personal digital assistants ("PDAs"), Web Tablets, touch screen remote controls, mobile phones, lap-top computers, and the like.

SUMMARY OF THE INVENTION

In accordance with the description that follows, a system and method is provided for enabling enhanced user interaction, information display, and interface selection for electronic devices having graphic display and touch screen capabilities. An understanding of the objects, advantages, features, properties and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the invention, reference may be had to preferred embodiments shown in the attached drawings in which:

FIGS. 3-9 illustrate exemplary methods for browsing and indicating content status using an illustrated, exemplary compact status indicator;

DETAILED DESCRIPTION

Figure 1:
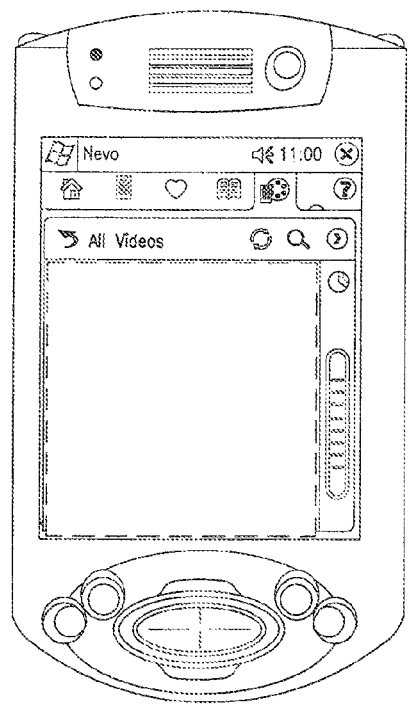
FIG. 1 illustrates exemplary devices for which the methods of the present invention may be implemented.
Figure 1:
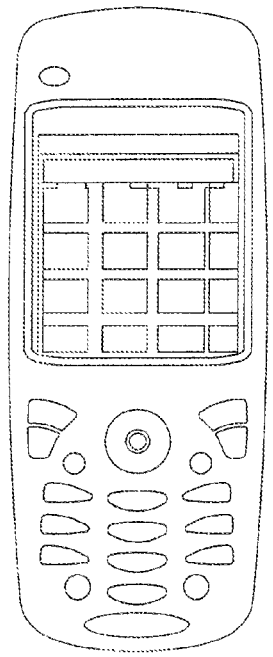
Figure 1:
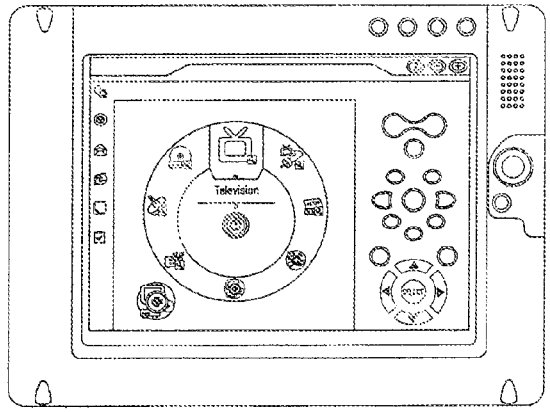

A universal remote control application and associated interfacing methods are provided for executing on a portable electronic device 10. By way of example, representative platforms for the device 10 include, but are not limited to, devices such as remote controls, personal computers, lap-top computers, Smart Displays, Web Tablets and/or PDAs manufactured by HP/Compaq (such as the iPAQ brand PDA), Palm, Visor, Sony, etc., mobile phones (i.e., Microsoft based Smart Phones, Palm OS and/or Symbian OS based phones), personal gaming systems (i.e., Nintendo GameBoy, Nokia N-Gage), etc. Thus, a preferred underlying platform includes a processor coupled to a memory system comprising a combination of ROM memory, non-volatile read/write memory, and RAM memory (a memory system); a key matrix in the form of physical buttons; an internal clock and timer; a transmission circuit; a power supply; a touch screen display screen to provide visible feedback to and accept input from a user (i.e., via virtual buttons or keys); and I/O circuitry for allowing the device to exchange communications with an external computer such as server and/or client and consumer appliances. Additional input/output circuitry, such as a IR transmitter(s) and/or receiver(s), microphone, loudspeaker or earphone jack, barcode or RFID reader, etc., may also be provided.

To control the operation of the device 10, the memory system includes stored programming instructions that are intended to be executed by the processor. In this manner, the processor may be programmed to control the various electronic components within the device 10, e.g., to monitor power, to cause the transmission of signals, etc. Within the memory system, the ROM portion of memory is preferably used to store fixed programming and data that remains unchanged for the life of the product. The non-volatile read/write memory, which may be FLASH, EEPROM, battery-backed up RAM, "Smart Card," memory stick, or the like, is preferably provided to store user entered setup data and parameters, downloaded data, etc., as necessary. RAM memory may be used by the processor for working storage as well as to hold data items which, by virtue of being backed up or duplicated on an external computer (for example, a client device) are not required to survive loss of battery power. While the described memory system comprises all three classes of memory, it will be appreciated that, in general, the memory system can be comprised of any type of computer-readable media, such as ROM, RAM, SRAM, FLASH, EEPROM, or the like alone or in various combinations. Preferably, however, at least part of the memory system should be non-volatile or battery backed such that basic setup parameters and operating features will survive loss of battery power. In addition, such memories may take the form of a chip, a hard disk, a magnetic disk, and/or an optical disk without limitation.

For commanding the operation of appliances of different makes, models, and types, the memory system may also include a command code library. The command code library is comprised of a plurality of command codes that may be transmitted from the device 10 under the direction of the stored programming instructions for the purpose of controlling the operation of an appliance. The memory system may also include instructions which the processor uses in connection with the transmission circuit to cause the command codes to be transmitted in a format recognized by an identified appliance. While an exemplary transmission circuit preferably utilizes infrared transmissions, it will be appreciated that other forms of wired or wireless transmissions, such as radio frequency, may also be used.

To identify appliances by type and make (and sometimes model) such that application(s) of the device 10 are adapted to cause the transmission of command codes in the format appropriate for such identified appliances, information may be entered into the device 10. Since methods for setting up an application to cause the transmissions of commands to control the operation of specific appliances are well-known, they will not be described in greater detail herein. Nevertheless, for additional details pertaining to remote control setup, the reader may turn to U.S. Pat. Nos. 6,225,938, 6,157,319, 4,623,887, 5,872,562, 5,614,906, 4,959,810, 4,774,511, and 4,703,359 which are incorporated herein by reference in their entirety.

To cause the device 10 to perform an action, the device 10 is adapted to be responsive to events, such as a sensed user interaction with one or more keys on the key matrix, a sensed user interaction with the touch screen display, a sensed user voice/sound input, a sensed gesture, a sensed movement, or other non-traditional command input methods, or a sensed signal from an external source such as a remote computer. In response to an event, appropriate instructions within the memory system are executed. For example, when a hard or soft command key associated with a remote control application is activated on the device 10, the device 10 may read the command code corresponding to the activated command key from the memory system and transmit the command code to an appliance in a format recognizable by the appliance. It will be appreciated that the instructions within the memory system can be used not only to cause the transmission of command codes to appliances but also to perform local operations. While not limiting, local operations that may be performed by the device that are related to the remote control functionality include favorite channel setup, macro button setup, command function key relocation, etc. Examples of such local operations can be found in U.S. Pat. Nos. 5,481,256, 5,959,751, 6,014,092, which are incorporated herein by reference in their entirety.

As discussed, the underlying platform of the device 10 preferably comprises a general purpose, processor system which is controllable by stored programming instructions, i.e., software. The software may include routines, programs, objects, components, and/or data structures that perform particular tasks that can be viewed as an operating system together with one or more applications. The operating system, such as the "Windows CE" brand operating system or the like, provides an underlying set of management and control functions, device drivers, and the like which are utilized by the various applications to offer the user functions such as a calendar, address book, spreadsheet, notepad, Internet browsing, etc., as well as control of appliances. Thus, it is to be understood that applications in addition to or complimentary with the remote-control-like application can also be supported by the device 10 and, as such, in terms of the internal software architecture, the remote-control-like application may be but one of several possible applications which may co-exist within the device 10.

In terms of providing operating system functionality, it should also be understood that the demarcation between the device 10 and a host/client computer, described in greater detail hereinafter, may vary considerably from product to product. For example, at one extreme the device 10 may be nothing more than a slave display and input device in wireless communication with a computer that performs all computational functions. At the other extreme, the device 10 may be a fully-functional computer system in its own right complete with local mass storage. It is also to be appreciated that a hardware platform similar to that described above may be used in conjunction with a scaled-down operating system to provide remote control functionality only, i.e., as a standalone application. In all cases, however, the principles expressed herein remain the same.

To provide a means by which a user can interact with the device 10, the device 10 is preferably provided with software that implements a graphical user interface. The graphical user interface software may also provide access to additional software, such as a browser application, that is used to display information that may be received from an external computer. Such a graphical user interface system is described in pending U.S. application Ser. No. 09/905,396, 60/334,774, and 60/344,020 all of which are incorporated herein by reference in their entirety. Though described in the below embodiments in conjunction with remote control software applications, it will be understood and appreciated that the various user interface and interaction based features described herein may be used in conjunction with any software program or application and are thus not specifically limited to applications directed to control of consumer appliances.

Compact Status Indicator

Figure 2:
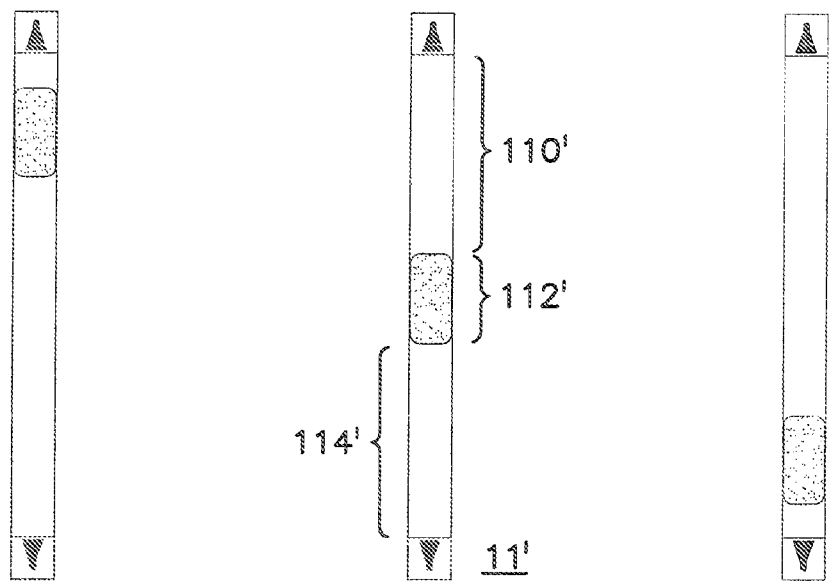
FIG. 2 illustrates an exemplary method for browsing and indicating content status using an exemplary prior art scrollbar.

For maximizing available display area on a user interface and for simplifying the process of indicating content status and/or browsing through a large content set, the device 10 utilizes a compact status indicator interface 11. In particular, the compact status indicator interface 11 is designed to overcome both size and functionality restraints of portable electronic devices, and present a full featured "scroll-bar" like interface and status indication to a user for browsing through a content set (i.e., a set of text or other displayed data referencing files, photos, music, videos, program guide information, etc., that cannot be conveniently displayed within the available display area of a device). In particular, presently to navigate within large data or content sets, the user must use a traditional scroll-bar type interface such as shown in FIG. 2. While traditional scroll-bar interfaces are able to present indicators to the user as to the size of the content set currently being browsed, and allow the user to browse through the content using one or more methods of interacting with the scroll-bar (e.g., via a mouse, cursor, stylus, etc.), such scroll-bars require a relatively large amount of space on the display and thus limit the amount of content display/viewing area. As will be appreciated, the loss of available display area (for content viewing or any other desired function) due to traditional scroll-bar type interfaces is especially problematic when implemented on relatively small electronic devices having correspondingly small displays. Additionally, for certain devices with restrictively small display screens such as mobile phones and the like it may not be feasible to implement any traditional scroll-bar style interface due to display space requirements, even when such an interface would be useful to a user. The compact status indicator of the current invention overcomes these limitations while presenting a full function content interface to a user.

Looking now to FIGS. 3-6, compact status indicator 11 as depicted is generally circular in shape and includes at least two portions 110 and 114 for indicating to a user the current status of an associated content set. Generally, the entirety of compact status indicator 11 (portions 110, 112, and 114 collectively) represent the entirety of the content set currently able to be browsed by a user. Portion 110 represents the amount of content which has been browsed through, and portion 114 represents the remaining amount of content available to be browsed by a user. Compact status indicator 11 may optionally include portion 112 for indicating to a user the relative amount of content the user is currently viewing within the content display area 12 as compared to the total content set being browsed. As such, portion 112 is configured (via programming in or accessible to device 10) to dynamically change depending on the size of content display area 12 relative the displayed content set, similar to the familiar operation of portion 112' of the traditional scroll-bar shown in FIG. 2.

Compact status indicator 11 may also indicate the relative location of the then displayed content set on a display via the position of portion 112. For example, in 11a the content set as then displayed in content display area 12 is substantially one-quarter of the way through the amount of available content to be displayed, in 11b the content set as then displayed in content display area 12 is substantially one-half of the way through the amount of available content to be displayed, and in 11c the content set as then displayed in content display area 12 is substantially thee-quarters of the way through the amount of available content to be displayed. In the event that portion 112 is not implemented in a specific embodiment and/or has been turned off by the user, it will be appreciated that a similar indication may be achieved by the relative position of the boundary between portions 110 and 114.

Figure 3:
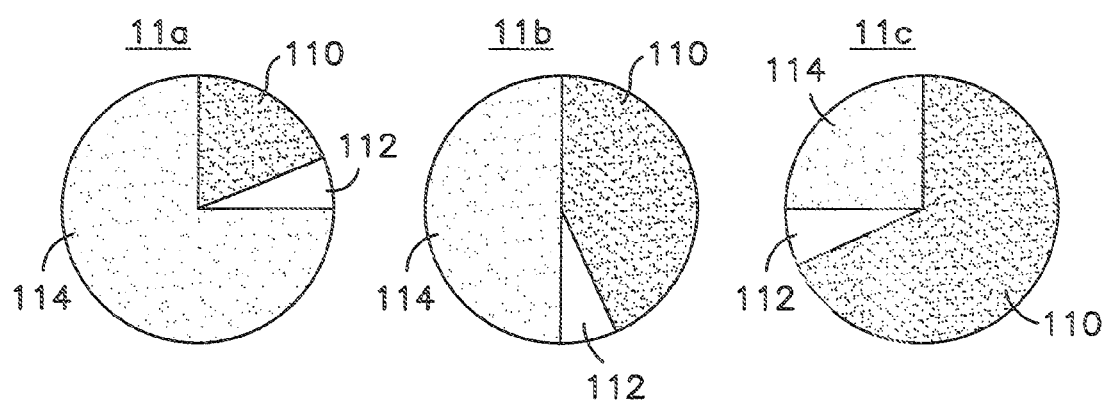
Figure 7:
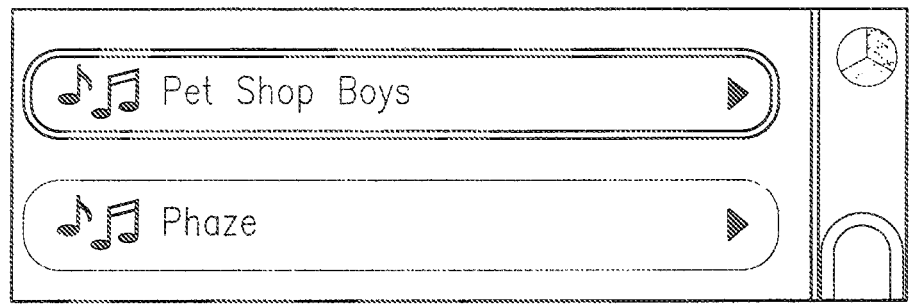

The inventive aspects of the present compact status indicator will be understood and appreciated by the foregoing description and associated drawings, however since in one exemplary method compact status indicator 11 is configured and operated to replace traditional scroll-bar 11', reference to corresponding portions may be seen in FIGS. 2 and 3 for clarification. Specifically, portion 110' of traditional status-bar 11' corresponds generally to portion 110 of compact status indicator 11. Portion 112' of traditional scroll-bar 11' corresponds generally to portion 112 of compact status indicator 11, which changes dynamically based on the proportion of displayed content to total content available for display from a given content set. Portion 114' of traditional scroll-bar 11' corresponds generally to portion 114 of compact status indicator 11.

Figure 8:
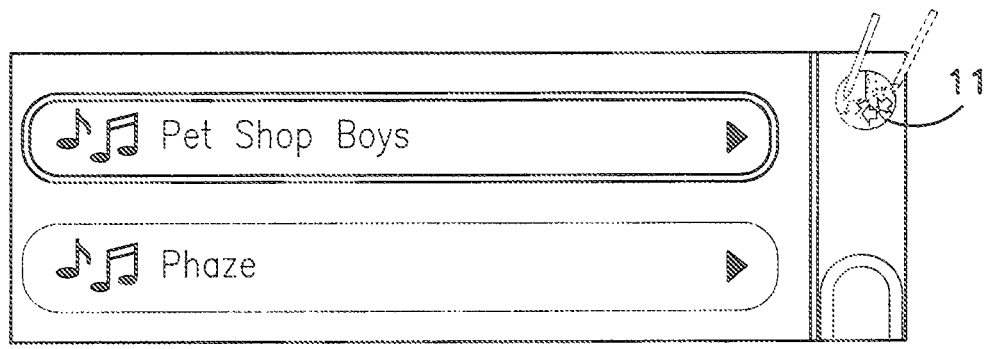
Figure 9:
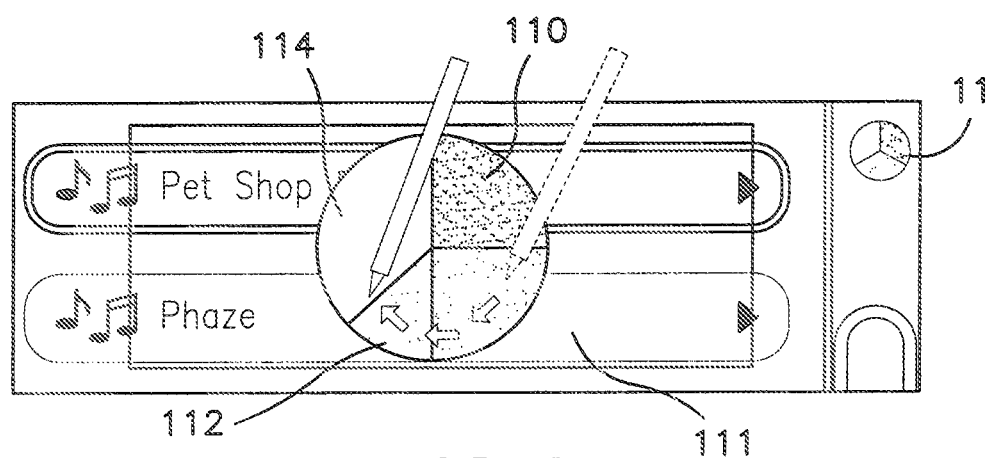

FIGS. 4-9 illustrate exemplary methods for using the compact status indicator of the present invention to interact with a content set or other element on a graphical user interface. A status indicator only embodiment is depicted in FIGS. 4-7, and generally serves only to indicate to a user the portion of content browsed though at a given time. An interactive compact status indicator embodiment is shown in FIG. 8, and includes portion 112 for indicating to a user the portion of content currently displayed relative to the total content set. The interactive indicator of FIG. 8 is also operative in conjunction with a mouse, stylus, or other similar user interactivity element to cause content in content display area 12 to advance further through the content set (i.e., scroll). Such interaction is more fully illustrated in FIG. 9, wherein a stylus is shown being operated (e.g., dragged or moved) in an arcuate fashion about an inner portion of the enlarged compact status indicator 111. Portion 112 may be configured in this embodiment as an interactivity guide (e.g., a portion outside of which user interactions with the touch screen will not cause movement of the content set) which moves radially about the compact status indicator as the user drags portion 112 in a clockwise or counterclockwise fashion with respect to the entirety of the compact status indicator. As will be appreciated from FIGS. 8 and 9, the compact status indicator may be used for interacting with a content set either in a compact form generally located on the periphery of a content display area (as shown in FIG. 8) or in an enlarged, superimposed interface directly above the content set to be controlled (as shown in FIG. 9). The enlarged status indicator 111 can be configured in a semi-transparent fashion such that viewing of the content set lying below the enlarged status indicator (as illustrated in FIG. 9) will be uninhibited for the user.

It will be understood and appreciated that the size, placement on a particular user interface or electronic device, shading, coloring, and other "look and feel" elements of the compact status indicator of the current invention may vary widely without departing from the spirit and scope of the current invention. Additionally, the particular methods and techniques for generating and allowing interaction with the compact status indicator will be apparent from the descriptions herein, as well within the routine skill of a programmer skilled in the art. For instance, when implemented in conjunction with a remote control application, the compact status indicator of the current invention can be configured to both provide status of displayed content sets, interaction with such content sets, as well as accomplish other desired user interactions with home appliances using the control methods described above. Thus, the compact status indicator may also be operable in a given device mode to not only indicate a relative position within an appliance state but also to provide interactive control of that state, such as volume control (wherein the pie-shaped indicator has a range from no volume to maximum volume), channel control/surfing (wherein the pie-shaped indicator has a range from the lowest available channel to the highest available channel), etc. In connection with operating the device 10 in this manner, interaction with the indicator may transmit appropriate commands such as volume up/down, channel up/down, etc. In certain circumstances, an absolute value may also be transmitted—such as a specific channel number if the device 10 is provided with a correspondence between a position of the indicator 112 within the pie-graph and a channel number within the range of channel numbers available.

Virtual Scroll Wheel

For further maximizing available display area on a user interface and for simplifying the process of browsing through a large content set, a device 10 may utilize a virtual scroll wheel interface 14. In particular, the virtual scroll wheel interface 14 is designed to overcome both size and functionality restraints of a small electronic device, and present a full featured "mechanical scroll-wheel" or "mechanical jog-dial" like interface to a user for browsing through a large content set (i.e., a set of text or other displayed data referencing files, photos, music, videos, etc. that cannot be conveniently displayed within the available display area of a device) using a finger, stylus, or other user interactivity element. In particular, presently to navigate within large data or content sets, the user must use a traditional scroll-bar type interface such as shown in FIG. 2, and/or an external, mechanical scroll-wheel or jog-dial type interface as are well known in the art. While traditional scroll-bar, scroll-wheel, and jog-dial interfaces are able to allow the user to browse through the content using one or more methods of interacting with the interface (e.g., via a mouse, finger, cursor, stylus, etc.), such scroll-bars require a relatively large amount of space on the display and thus limit the amount of content display/viewing area. Specifically in the case of scroll-bars, finger based interaction (i.e., using ones thumb as would be possible using a physical scroll-wheel interface) becomes difficult to implement as scroll-bars were designed for interaction via cursor or stylus type interactivity elements, and become unwieldy when operated with large blunt objects such as fingers. Likewise, physical scroll-wheels and jog-dial are both costly to implement on small electronic devices, and consume valuable space on the case of the device. As will be appreciated, the difficulty in browsing content via a scroll-bar using ones thumb, and the loss of available display and/or device case area (for content viewing or any other desired function) due to traditional scroll-bar, scroll-wheel, and/or jog-dial type interfaces is especially problematic when implemented on relatively small electronic devices. Additionally, for certain devices with very small display screens such as mobile phones and the like it may not be feasible to implement any traditional scroll-bar, physical scroll-wheel and/or jog-dial style interface due to display space requirements, even when such an interface would be useful to a user. It would also be desirable to provide the advanced scroll "acceleration" characteristics of traditional mechanical scroll-wheels and jog-dials to an electronic device in virtual (on display screen/user interface) form. The virtual scroll wheel of the current invention overcomes these limitations while presenting a full function interface to a user.

Figure 10:
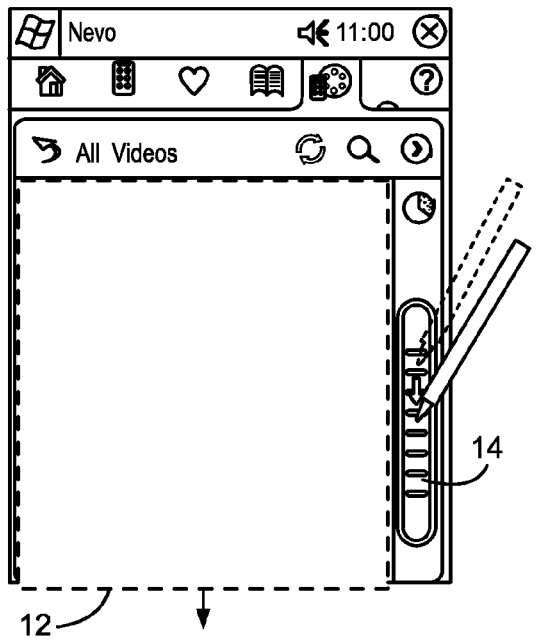
FIGS. 10, 11A, and 11B illustrate an exemplary method for scrolling through content using an illustrated, exemplary virtual scroll wheel.
Figure 11A:
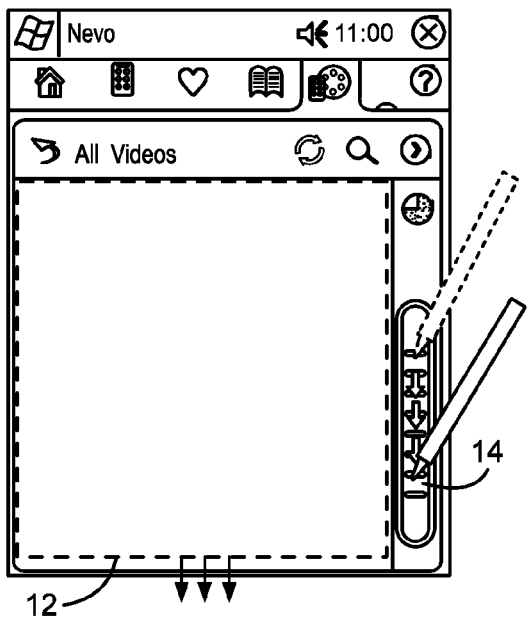
Figure 11B:
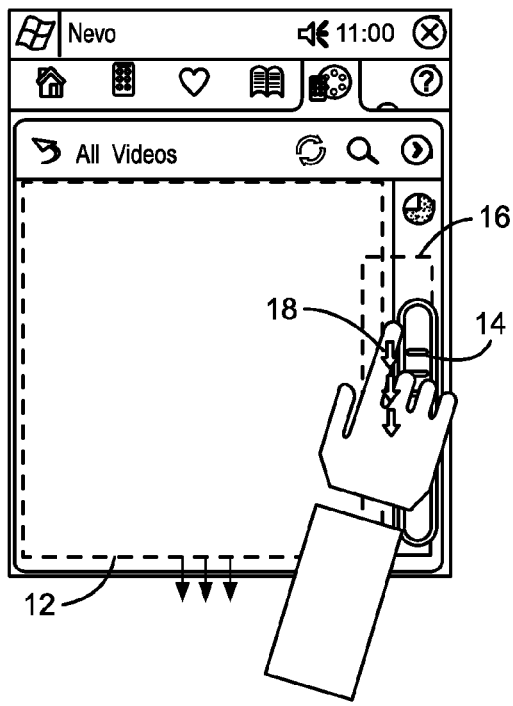
Figure 12:
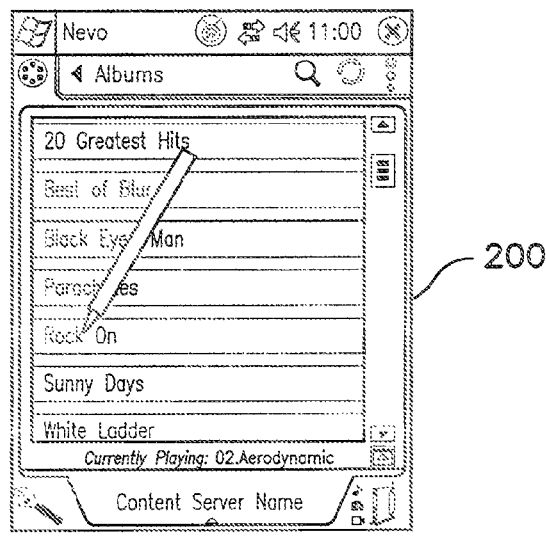
FIGS. 12-17 illustrate exemplary methods for presenting a graphic user interface having an illustrated, exemplary scalable interface.

Looking now to FIGS. 10 and 11, virtual scroll wheel 14 as depicted is generally rectangular in shape and is configured such that a user may use a finger, stylus, mouse, or other interactivity element directionally up or down within the virtual scroll wheel 14 to effect movement (i.e., scrolling, browsing, accelerating, etc.) of content displayed in content display area 12. The actual shape, graphical elements, and other "look and feel" characteristics of virtual scroll wheel 14 are the subject of design choice, however functionally, programming in or available to the device 10 may cause various interactions of an interactivity element with the area defined by virtual scroll wheel 14 in display 1 to generate different behaviors and movement of content in display area 12. For instance, as illustrated in FIG. 10, when a finger or stylus is caused to touch virtual scroll wheel 14 at a substantially top portion and be dragged (and held) to a point substantially half way down virtual scroll wheel 14, the content displayed in content display area 12 will appear to scroll upward at a defined rate of speed (generally dependent on the distance between the first stylus screen touch location and the location at which the stylus came to rest on the screen, relative the area defined by virtual scroll wheel 14). Similarly, as illustrated in FIG. 11, when a stylus is caused to touch virtual scroll wheel 14 at a substantially top portion and be dragged (and held) to a point substantially at the bottom of virtual scroll wheel 14 (i.e., substantially twice the distance as shown in FIG. 10), the content displayed in content display area 12 will appear to scroll upward at a rate of speed substantially twice that of the method described in relation to FIG. 10.

Other finger and stylus (and generally any user interactivity element) interactions are possible given the described method, for instance the stylus may be first caused to touch virtual scroll wheel 14 at a substantially middle location, whereby a movement dragging the stylus downward within virtual scroll wheel 14 causes increasingly accelerated upward scrolling of the content in content display area 12, and subsequent upward dragging of the stylus (generally without allowing the stylus to leave the surface of display 1) causes a gradual slowing, and then reversal of direction in the scrolling of content. Likewise, for interaction by a users finger in a manner similar to a scroll wheel on a mouse, virtual scroll wheel 14 may be configured (through programming on device 10) to respond to successive swipes or drags (e.g., touches and releases) of a users thumb in the direction of scroll bar orientation (as determined by programming in or available to device 10). For instance, downward vertical swipes or drags of a users thumb may cause upward scrolling of the content in content display area 12, while upward vertical swipes or drags of a users thumb may cause downward scrolling of the content in content display area 12. It will be understood and appreciated that distances and directions traveled within virtual scroll wheel 14 for scrolling and acceleration purposes, and the particular method and technique of monitoring and calculating stylus screen touch, drag, pause, and off points are the subject of design choices that may be dictated by, among other factors, device platform, operating system, programming language, etc., and are all well within the routine skill of a programmer skilled in the art. By way of example, with reference to FIG. 11b, in order to facilitate operation of the virtual scroll wheel via a large (relative to overall screen size) blunt object such as a finger 18, the touch area responsive to input 16 may be larger than the displayed scroll wheel 14. Additionally, it will be appreciated that the size, placement on a particular user interface or electronic device, shading, coloring, and other "look and feel" elements of the virtual scroll wheel of the current invention may vary widely without departing from the spirit and scope of the current invention. For instance, when implemented in conjunction with small electronic devices having touch screens such as PDAs and the like, the defined screen area for operation of the virtual scroll wheel may consist solely of the rightmost edge (or any side of the screen) of pixels of the screen, without any visible graphic elements or indicators. As such, many methods of implementing and using the virtual scroll wheel of the current invention are possible without departing from the spirit and scope of the current invention.

Scalable User Interface

For further maximizing available display area on a user interface and for providing quick transition between a number of available interface states or parameters, or a continuum of interfaces states available to a user, a device 10 may utilize a scalable user interface 200. In particular, the scalable user interface 200 is designed to overcome both size and functionality restraints of portable electronic devices, and present an easily modifiable user interface consisting of two or more interface states to a user for operating and interacting with an application or program on device 10. In particular, to presently modify the particular level of detail, resolution, or other user definable graphic user interface characteristics, the user must use a number of tedious steps and/or operations on the device or software application to effect the desired modifications. While methods such as skins, accessibility settings, and configurable toolbars have been used to allow a user to customize various aspects of a particular user interface, such methods are laborious as indicated above, and lack the immediacy of customization required for certain applications. As will be appreciated, for certain applications such as remote control user interfaces for electronic devices, the lack of immediately customizable user interfaces is problematic given that one main purpose of remote control applications is to save users time and effort when interacting with their home appliances and media content. As such, current user interface customization methods are lacking for multiple user interfaces, applications having multiple interface screens and elements, and for quickly switching between desired application interface states and parameters. The scalable user interface of the current invention overcomes these limitations while presenting an easily customizable, full function interface to a user.

Figures 13, 14:
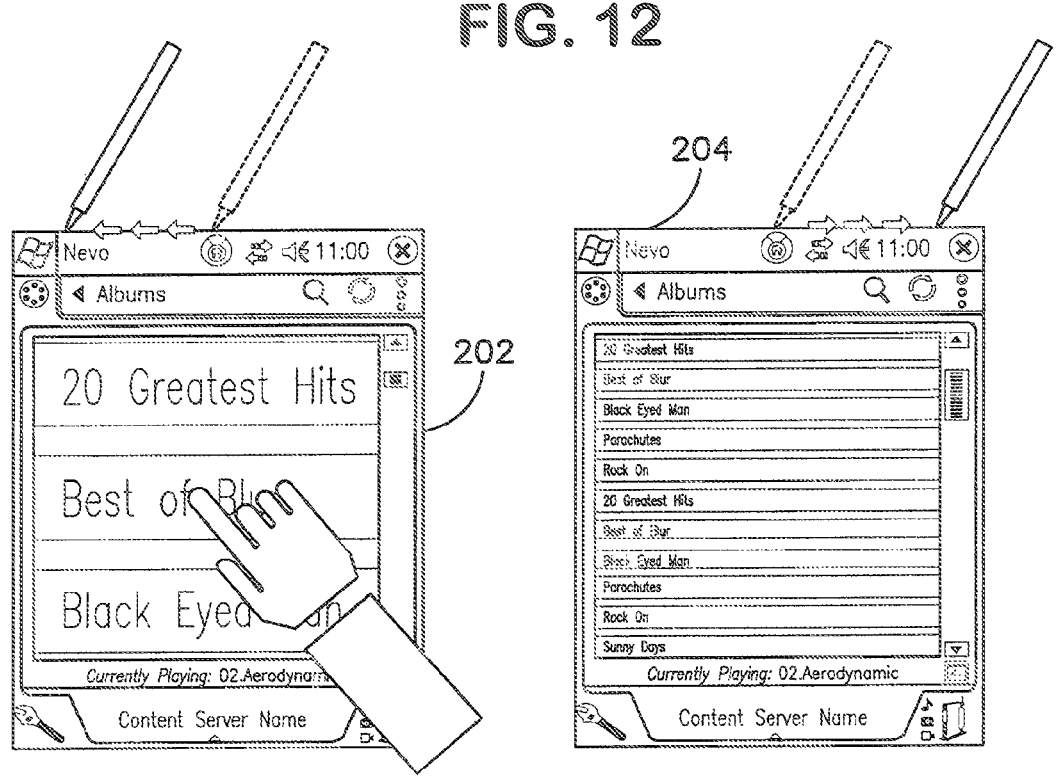

Looking now to FIGS. 12-17, scalable user interface 200 as depicted is in a first or "default" state of customization (i.e., the default interface for the particular software application). Particularly, scalable user interface 200 as illustrated is a content access interface for a remote control application, however scalable user interface may be any user interface and is not limited to any particular interface or software application. Shown in FIG. 13 is second interface state 202, which generally consists of an enlargement of a portion of interface 200, such that interface 202 may be more easily read under dim lighting conditions or by users having vision impairments, or in the case of content selection, may be more easily interacted with via finger input versus stylus input (e.g., for operation of device 10 similar to a button based remote control or similar electronic device). Conversely, shown in FIG. 14 is third interface state 204, which generally consists of a minimized portion of interface 200, such that interface 204 may display more of the content set or other interface elements shown in interface 200 such that a user can view and browse more available content at a given time.

In order to effect modification of interface 200 to interface 202 or 204, the user need not access any menus, settings pages, or the like according to the current invention. Rather, programming on or accessible to device 10 causes various interactions of an interactivity element with a predefined area of the screen to cause interface 200 to be reconfigured as interface 202 or 204. For example, as illustrated in FIG. 13, a user may operate a stylus, finger, mouse, or other user interactivity element directionally from a point at substantially the top center of the display to be dragged to a location substantially in the upper left corner of the display in order to modify interface 200 to interface 202. As will be appreciated, interfaces 200 and 202 may be discrete interfaces (i.e. two individual interface states, such as bitmap or other graphical based interfaces) and interface 202 may not become active/loaded until the stylus has traveled a certain distance across the screen or reached a predefined screen location. Conversely, interfaces 200 and 202 may be two points on a continuum of possible interface states (i.e., such as would be possible with a zooming algorithm applied to interface 200, or the use of vector based interface elements). Likewise, as illustrated in FIG. 14, a user may operate a stylus, finger, mouse, or other user interactivity element directionally from a location at substantially the top center of the display to be dragged to a location substantially in the upper right corner of the display in order to modify interface 200 to interface 204. As will be appreciated, interfaces 200 and 204 may be discrete or continuous as described above.

Figure 15:
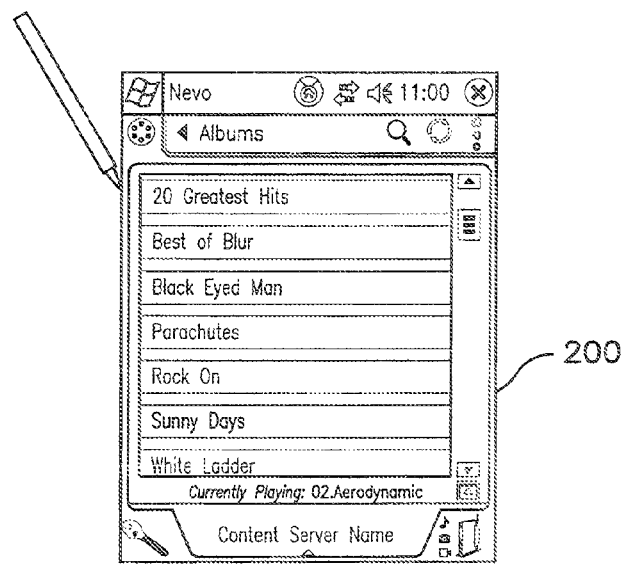
Figures 16, 17:
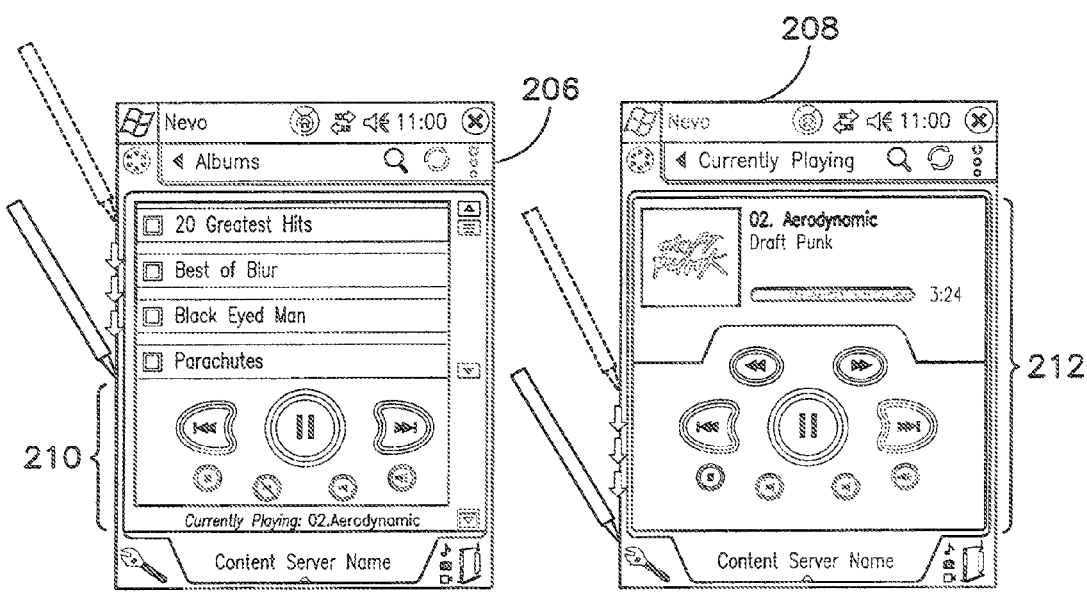

While not to be taken as limiting, the exemplary method described above involves interacting with a top portion of the display in order to modify one parameter (e.g., resolution, the enlarging or minimizing of interface elements) of interface 200. As shown in FIGS. 15-17, a side portion of the display is shown as being used to modify a second interface parameter (e.g., detail, the adding or subtracting of interface elements) using a user interactivity element (finger, stylus, mouse, cursor, etc). Specifically, as shown in FIG. 16, interface state 206, which includes control interface elements 210, is effected by operating an interactivity element directionally from a location at substantially the top left of the display to be dragged to a location substantially in the far most middle left portion of the display. Likewise, as shown in FIG. 17, interface state 208, which includes control interface elements 212 (which include original control interface elements 210 as well as an expanded detail view of the currently playing media) is effected by moving a user interactivity element directionally from a location substantially in the far most middle left portion of the display to be dragged to a location substantially in the bottom left of the display. As will be appreciated, interfaces 206 and 208 may be discrete or continuous as described above. Additionally, for all of states 200, 202, 204, 206, and 208, (and any plurality of continuous interface states between them according to one embodiment of the current invention) dragging of the stylus or other user interactivity element in a direction opposite those described above will effect a reversion to the previous interface state, such that customization between all possible states may be effected quickly by dragging the stylus or a finger across the top and left most edges of the display. As described earlier in connection with FIG. 11b, boundaries of the various touch screen areas sensitive to input may be oversized as appropriate to facilitate finger input. Furthermore, and in keeping with the teachings and principles of the current invention, programming on or available to the device 10 may enable additional or "hybrid" interface states which consist of a mixture of modified parameters one and two (i.e., interface resolution and interface detail) via dragging of the stylus or other interactivity element along the diagonal running between top and left screen edge portions (or any other selected areas) of the display. In this way, a larger number of discrete interface choices, or virtually unlimited choice of interfaces in the case of a continuum of interfaces, is possible by operating the stylus or other user interactivity element along a diagonal, or generally any multi-component (x,y) portion, of the display.

It will be understood and appreciated that the actual shape, graphical elements, and other "look and feel" characteristics of interface states, the type and nature of modifiable interface parameters, as well as location and direction of defined display areas for interface customization purposes, and the particular method and technique of monitoring and calculating stylus screen touch, drag, pause, and off points are the subject of design choices that may be dictated by, among other factors, device platform, operating system, programming language, etc, and are all well within the routine skill of a programmer skilled in the art. As such, many methods of implementing and using the scalable user interface of the current invention are possible without departing from the spirit and scope of the current invention.

Virtual Gesture Pad

For providing an enhanced user interface to a user such that user movements and gestures on a touch screen display enable control and operation of a software application, the device 10 utilizes a virtual gesture pad interface 300. In particular, the virtual gesture pad interface 300 is designed to overcome both size and functionality restraints of portable electronic devices, and present an easily controllable interface such that predefined movements of a stylus, finger, cursor, or other user interactivity element may control operation of a software application, optimally without full attention of the user (i.e., single handed operation and/or operation while not viewing the display of device 10). For example, U.S. Pat. No. 6,396,523 describes a remote control device having a touch pad element adapted to receive gesture based input for initiation of various remote control functions. In this manner, gesture input is converted to command functions and control of the associated home entertainment equipment is effected.

While the system described in U.S. Pat. No. 6,396,523 performs adequately when implemented on a larger scale device having both physical buttons and touch pad elements to facilitate interaction with information presented on a separate display device such as a television screen, what is needed is a virtual gesture pad that functions to provide advanced control based features quickly and interchangeably with traditional soft button based controls for electronic devices having integrated touch sensitive screen displays. As will be appreciated, for certain applications such as touch screen based remote control user interfaces for electronic devices, the lack of easily accessible and intuitive gesture based user interfaces is problematic given that users often desire to operate the remote control application using a single hand or finger, and/or without directly viewing the display screen. As such, current gesture based methods for control and operation of software applications are lacking for integrated touch screen devices. The virtual gesture pad of the current invention overcomes these limitations while presenting an intuitive, interchangeable, gesture based interface to a user.

Figure 18:
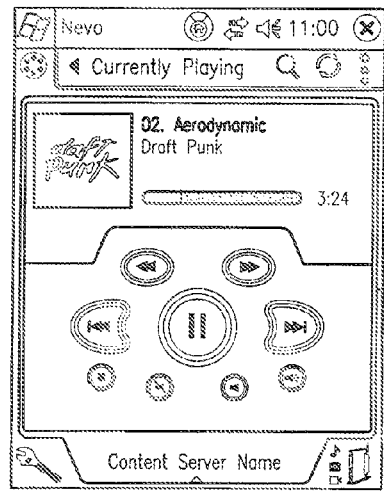
FIGS. 18-22 illustrate an exemplary method for gesture based software application control using an illustrated, exemplary virtual gesture pad interface.
Figure 19:
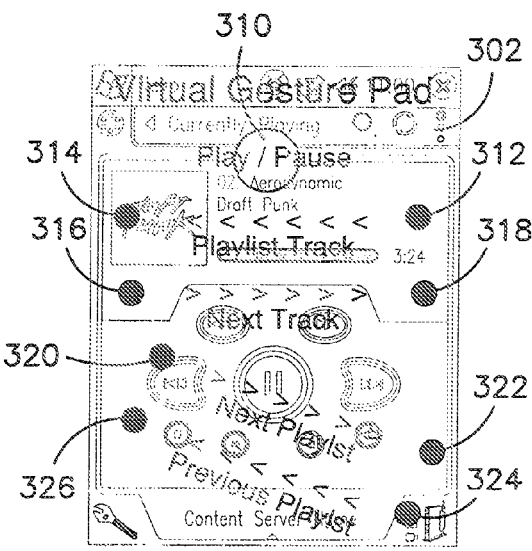

Looking now to FIGS. 18-22, virtual gesture pad interface 300 as depicted is in a "default" or non-gesture based input state (i.e. no gesture commands are accepted by the interface and associated programming in the default state). In the default state shown in FIG. 18, operation of and interaction with the software application is effected by various soft buttons and/or other interface elements visible on the display. Upon initiation, (which may consist of a button press, menu selection, initial gesture on the touch screen, voice command, system events, or any other user or device based input), a virtual gesture pad 302 may be overlaid on the screen display such that the button based commands of FIG. 18 are no longer available to the user. Shown in FIG. 19 is an exemplary virtual gesture pad 302, which in one embodiment of the present invention, consists of a semi-transparent interface overlay having gesture targets for effecting various software controls. For example, gesture target 310 consists of a single defined area of the display (a substantially circular shape in FIG. 19) whereby a user touching anywhere within (or within a defined radius from) target 310 will effect either a "play" or "pause" command successively with each press. Gesture target 312 corresponds with target 314 in that the user must touch the display substantially on or near target 312, then drag a finger (or other interactivity element) across the screen to target 314 before lifting the finger off the display in order to effect a "previous track" command from the associated software application. Likewise, gesture target 316 corresponds with target 318 in that the user preferably touches the display substantially on or near target 316, then drags a finger (or other user interactivity element) across the screen to target 318 before lifting the finger off the display in order to effect a "next track" command from the associated software application. Notably, the "previous track" and "next track" commands require gestures in substantially opposite directions with respect to the display, thus enabling an increased level of error correction such that programming on or available to the device will be able to accurately determine which command was intended by the user based on a brief user gesture. Gesture targets 320 and 322, and targets 324 and 326 operate in a similar fashion in order to effect "next playlist" and "previous playlist" commands respectively. Targets 320, 322, 324, and 326 are located in a different portion of the display from targets 312, 314, 316, and 318, as well as being oriented at a different angle so that further error detection and correction mechanisms will be possible with the virtual gesture pad.

Figure 20:
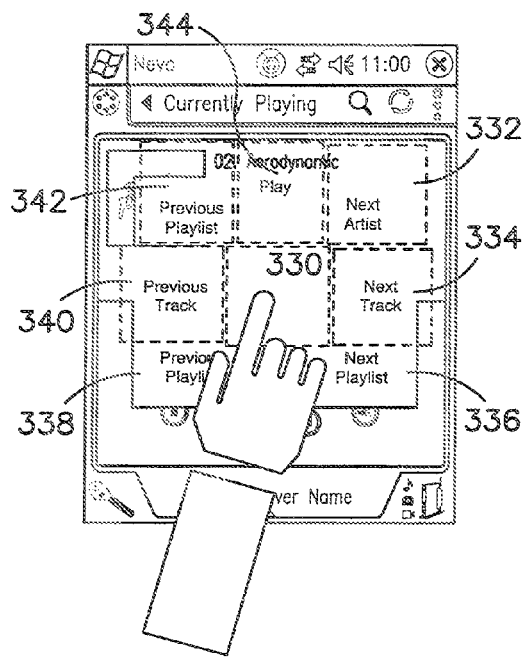
Figure 21:
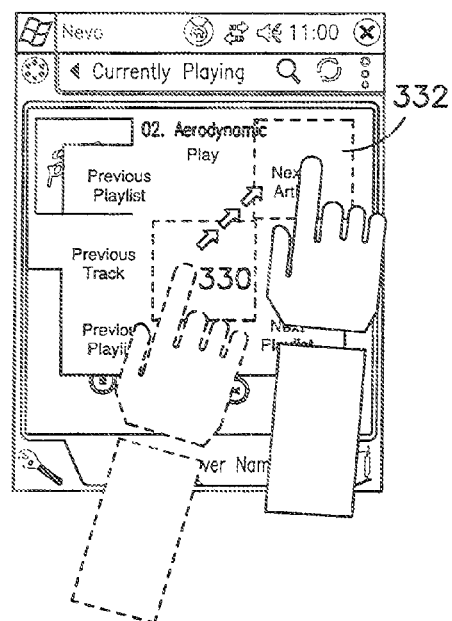
Figure 22:
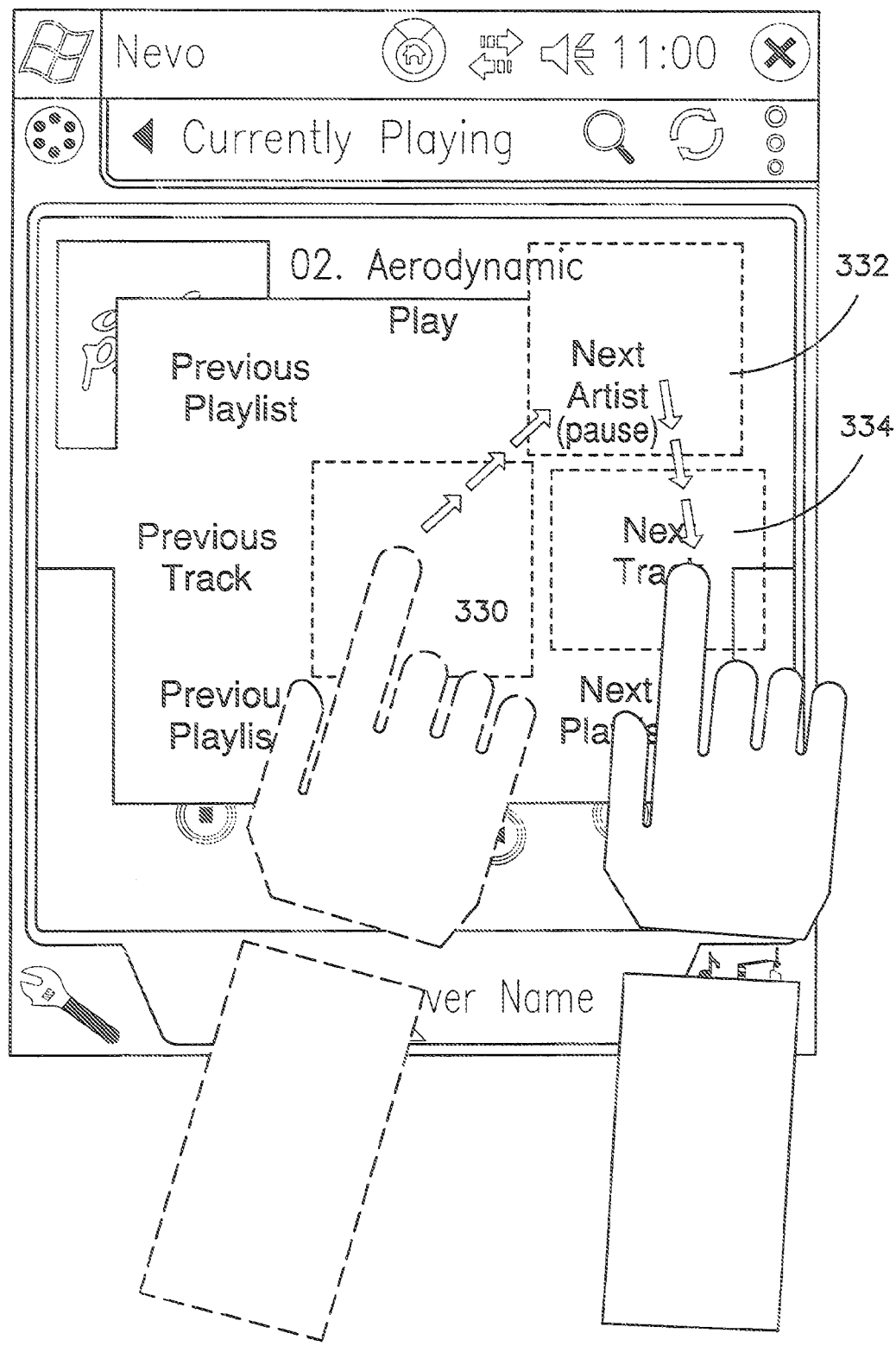

FIGS. 20-22 illustrate another embodiment of the virtual gesture pad of the current invention. In particular, FIG. 20 illustrates a substantially square central gesture target 330 which is surrounded by associated command targets 332, 334, 336, 338, 340, 342, and 344. Central target 330 does not on its own correspond to a command or control of the associated software, but rather functions as a central point from which other commands can be initiated. For example, as shown in FIG. 21, a user touching the display in target 330, dragging a finger diagonally to target 332, and then removing the finger from the display (or pausing for a predetermined time period once within target 332) will effect a "next artist" command through the associated software. Other commands may be similarly effected by a user appropriately dragging a finger from central target 330 to the desired command target. The concept of pause detection and/or sensed directional change on the touch screen (both of which are well known by those skilled in the art, as well as well within the routine skill of a programmer skilled in art) can be used to accomplish the sending of multiple control or operation commands in the same gesture. For example, as shown in FIG. 22, a user touching the display in target 330, dragging a finger diagonally to target 332, pausing for a predetermined time (or conversely causing programming in or available to device 10 to detect directional changes rather than pauses on the display) and then dragging her finger to (or pausing for a predetermined time period once within) target 334 will effect a "next artist" command followed by a "next track" command through the associated software.

It will be understood and appreciated by those skilled in the art that various configurations of virtual gesture pads 302 and 304, including different shapes, sizes, and locations of the various gesture targets and the particular method and technique of monitoring and calculating finger or stylus screen touch, drag, pause, and off points are the subject of design choices that may be dictated by, among other factors, device platform, operating system, programming language, etc., and are all well within the routine skill of a programmer skilled in the art. For instance, using methods similar to those illustrated and described in reference to FIGS. 20-22, virtual gesture pad type commands and operation may be programmed and used on traditional hard button, or touch panel based devices (i.e., the Kameleon brand remote control made by Universal Electronics Inc. and sold under the One For All brand name). As will be appreciated, the touching and dragging of a users finger on such remotes may be somewhat more difficult than on LCD or touch screen based devices, however the successive directional activation of various buttons and button combinations can effect gesture based controls for such remotes using the inventive concepts of the present invention. Additionally, it may be advantageous for certain applications or interface implementations to configure a virtual gesture pad such that gesture based functions and commands are possible without the display of any associated gesture command screens, overlays, targets, or other display based representations. In this way a user may initiate gesture commands based on associated programming on the device, but retain full access and visibility of the associated application during use. As such, many methods of implementing and using the virtual gesture pad interface of the current invention are possible without departing from the spirit and scope of the current invention.

Graphical Search Query Interface

Figure 23:
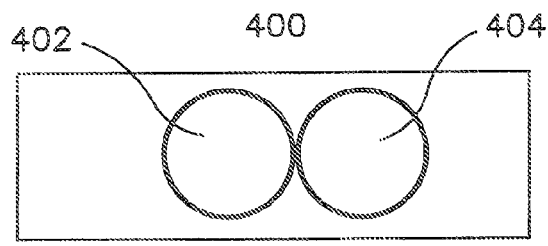
FIGS. 23-26 illustrate an exemplary data display and selection method using an illustrated, exemplary graphical search query interface.
Figure 24:
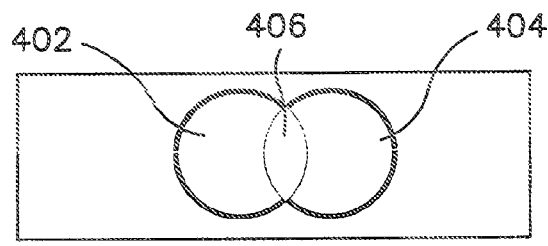
Figure 25:
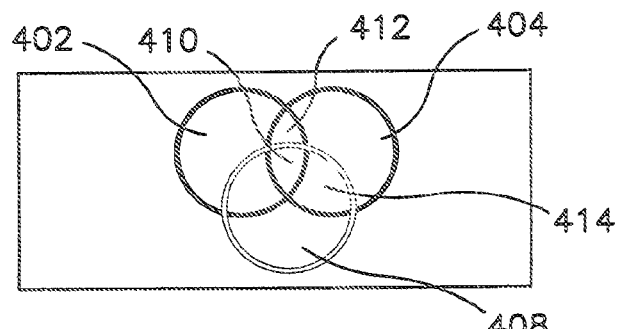

For maximizing available display area on a user interface and for simplifying the process of indicating to a user the results of a search query and allowing the user to interact with the search query results, a device 10 may utilize a graphical search query interface 400 as shown in FIGS. 23-25. In particular, the graphical search query interface 400 is designed to overcome both size and functionality restraints of portable electronic devices, and present a graphical representation and interactive interface to a user for browsing through one or more search query results (i.e., any search query performed by a user for quickly locating desired text, data, photo, music, video, program guide information, and/or other related content) and conveniently displaying such results within the available display area of a device. The graphical search query interface of the current invention overcomes the limitations in the prior art and presents a full function search query interface to a user.

Looking now to FIGS. 23-26, graphical search query interface 400 as depicted consists of at least two query interface areas 402 and 404 for indicating to a user the relation of a search query criterion 402 (i.e., musical albums beginning with the letter "S") with returned data or results set 404. In one exemplary configuration, query interface area 402 and results set 404 are generally circular in shape, and are moved such that they overlap one another as results set 404 begins to match items with query criterion 402 (i.e., as programming on device 10 performs a search based algorithm designed to match a given text based query with data, files, or other content on or available to device 10). For example, as shown in FIG. 24, matching results set 406 occupies the area created by the overlap of query interface area 402 and results set 404. In this way an indicator of the matching query results, and the relative success of the user's particular search terms in matching an associated data set, is presented in an appealing, intuitive manner. Optionally, as shown in FIG. 25, a second, or sub-query criterion may be entered by a user, and is represented graphically as sub-query area 408. Also shown in FIG. 25 is results set area 412, which represents only those results returned by the search query represented by query area 402, and results set area 414, which represents only those results returned by the search query represented by sub-query area 408. Results set area 410 represents the matching results returned by the combination of both criteria, i.e., the search query and sub-query. As will be appreciated, the search query, and sub-query will return individual results sets pertaining to the particular terms searched, and in some cases there may be some commonality between items in the respective results sets (e.g., in the case where a user searches for terms or properties that pertain to common data fields for a particular data or content set). For example, the search query relating to query area 402 could be a content search for musical albums beginning with the letter "S," while the sub-query relating to sub-query area 408 could be a content search for musical albums released in the year "1985." A user might have music files on a device, such as a computer, such that some results (i.e., those represented by results area 412) are all musical albums beginning with the letter "S" which were not released in 1985, some results (i.e., those represented by results area 414) are all musical albums released in the year "1985" which do not begin with the letter "S," and some results (i.e., those represented by results area 410) are all musical albums beginning with the letter "S" which were also released in the year "1985."

Figure 26:
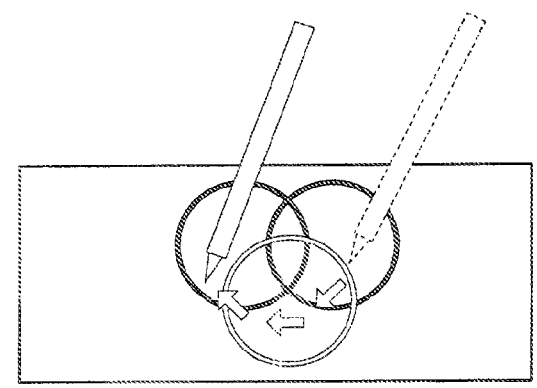

Given the above disclosure and associated figures, it will be appreciated by those skilled in the art that the described results set constitute Venn diagrams as applied to Boolean search methods, however it is one object of the present invention to present these results sets to a user in a dynamic and interactive fashion. As shown in FIG. 26, having entered a particular search query and optional sub-query, a user may dynamically modify the displayed results set (i.e., the actual content reference data displayed in the display area 12 of device 10, or at any other location of display 1) by interacting with one or more of the graphically displayed results set areas 406, 410, 412, and 414 and/or query areas 402 and 408 of graphical search query interface 400 using a finger, stylus, or any other user interface element. In the above described example, by simply touching or selecting result set area 410, all data referencing all musical albums beginning with the letter "S" which were also released in the year "1985" will be displayed in the content display area of the device for further user selection or interaction. The user may interact with results set areas 406, 412, and 414 in a similar fashion. As shown in FIG. 26, a user may also touch and drag one or more of the query areas 402 and 408, and result set 404 in order to modify one or more search query parameters, also causing dynamic modification to the displayed results set shown in the display area of device 10. For example, dragging sub-query area 408 to the right or the left in the present example may cause the search term itself to be dynamically modified (e.g., scroll forward though the years field as sub-query area is dragged to the right with respect to its original position, and scroll backward through the years field as sub-query area is dragged to the left with respect to its original position). As such, graphical search query interface 400 and the associated displayed results sets are configured (via programming in or accessible to device 10) to dynamically change depending on the particular search terms, as well as user interactions with graphical search query interface 400.

It will be understood and appreciated that the size, placement on a particular user interface or electronic device, shading, coloring, and other "look and feel" elements of the graphical search query interface of the current invention may vary widely without departing from the spirit and scope of the current invention. Additionally, the particular methods and techniques for generating and allowing interaction with the graphical search query interface will be apparent from the descriptions herein, as well as well within the routine skill of a programmer skilled in the art. For instance, various algorithms for causing search terms or results sets to be modified can be implemented in conjunction with the graphical search query interface of the current invention to accomplish desired user experience goals for a specific device or software product without departing from the spirit and scope of the present invention.

Graphical Indication of Device Mode and State

Figure 27:
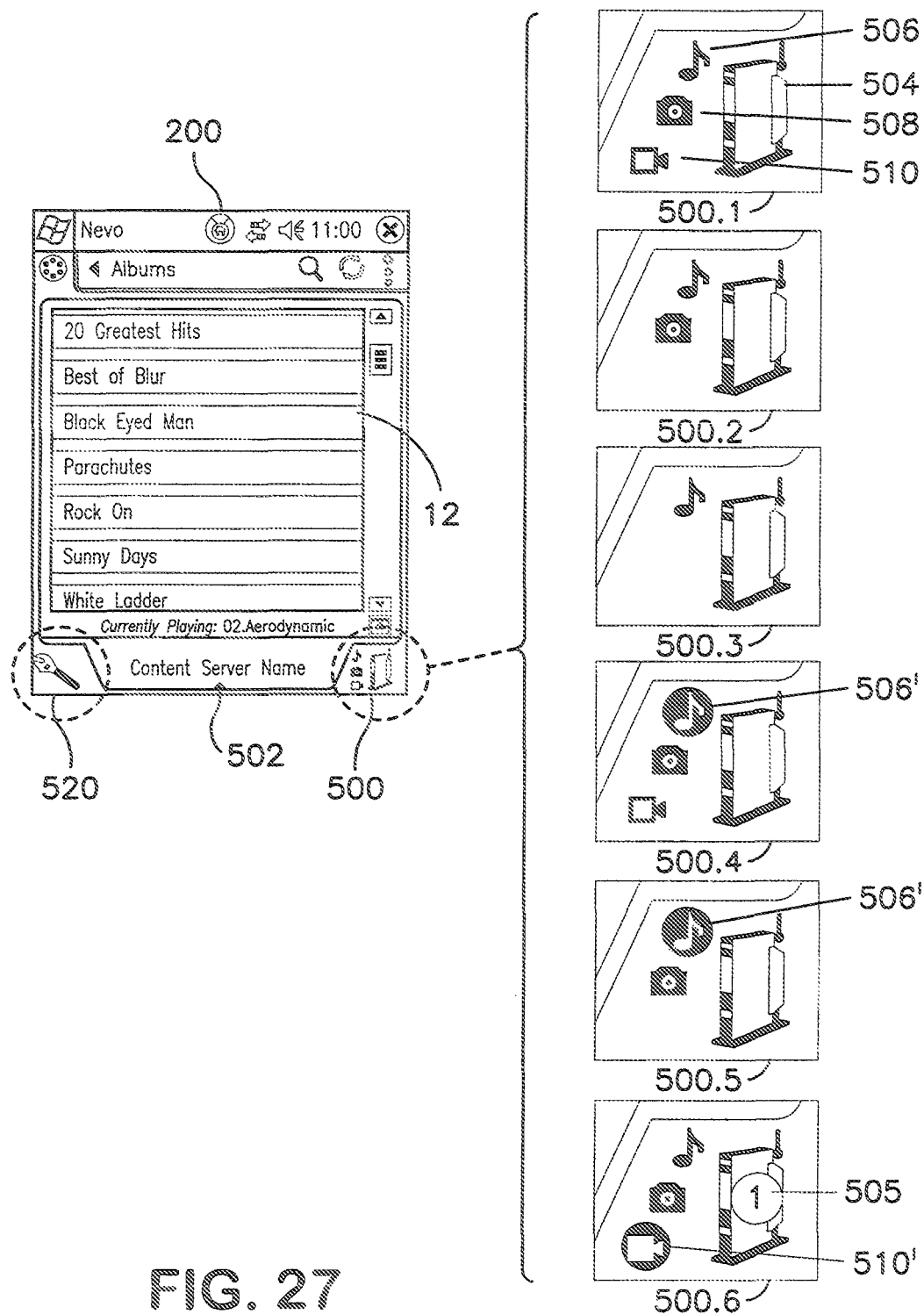
FIG. 27 illustrates an exemplary graphic user interface method for displaying and selecting content types supported by media servers or renderers.

Device 10 and associated application software may be configured to operate networked control environments wherein some or all of the home appliances and components are configured to be network enabled and interoperable, and which include one or more media server devices and media rendering devices (e.g., as defined and described in the UPnP and/or HAVi specifications which can be found at the upnp.org and havi.org websites respectively and which are incorporated herein by reference in their entirety). Turning now to FIG. 27, when the exemplary user interface methods are applied to the control, selection, and delivery of media content from server devices to rendering devices, the displayed user interface 200 may include areas 500, 502 used to convey information to the user regarding the currently selected server or rendering device and the types of content available from it or supported (for playback or other processing) by it. This is especially advantageous when the interface is applied to a networked consumer entertainment environment wherein multiple server and rendering devices exist, each with varying media based services and capabilities. In the illustrative example of FIG. 27, area 502 displays the name of the content server currently selected, and area 500 displays a representation of the media server currently selected. Icon 504 may be representative of a server device such as a computer, networked storage device, a media server device, etc. In one instance, area 500 may provide additional information regarding the types of content available from that server. With reference to the detailed views 500.1 thru 500.6, an icon 504 representative of the selected server is accompanied by content type sub-icons 506, 508, 510 indicating the availability of music, photographs (i.e., still pictures) and video content respectively. By way of example, 500.2 illustrates a representation of a server from which both music and photographic content is available, while 500.3 illustrates the representation of a server from which only music is available. Additionally, the appearance of one of the content type sub-icons may be altered (highlighted, flashing, animated, inverted, etc.) to further indicate to the user which type of content is currently listed and available for selection in the content display area 12. In this context, by way of detailed example a label such as "Chicago" in area 12 may ambiguously reference either a movie, a rock band, or a simple photograph of the Lake Michigan waterfront. Alteration of the appropriate icon 506' as illustrated in 500.4 or 500.5 (Chicago the band) or 510' as illustrated in 500.6 (Chicago the movie) may be used to remove this ambiguity.

It will be appreciated that in the case of servers offering multiple content types, switching between content types to be listed in area 12 may be accomplished by touching one of the sub-icons 506, 508, 510 with a stylus, finger, cursor, etc. Such interaction may occur directly within the area 500 illustrated, or alternatively an initial touch may cause an enlarged semi-transparent version of this area to overlay the display in a manner similar to that described earlier in connection with FIG. 9.

In another aspect of the current invention, area 500 may provide information regarding a rendering device currently selected rather than a content server. In this case, icon 504 may be representative of a renderer such as a stereo amplifier, TV set, Smart Display, Linksys Digital Media Adapter, HP Digital Media Renderer, or other hardware or software based media renderer, and sub-icons 506, 508, 510 may indicate which types of content that rendering device is capable of processing. In a manner similar to that described above, one of the sub-icons may be highlighted to indicate the currently selected, or currently playing media type. Additionally, in order to indicate to a user that the rendering device represented by icon 504 is one of a plurality of available rendering devices for use, an alphanumeric indicator 505 may be associated with icon 504. Alphanumeric indicator 505 may represent the number of rendering devices available, or may represent the order of the particular rendering device being represented by icon 504 from a number of available rendering devices. Alphanumeric indicator 505 may be placed anywhere on or near icon 504 such that a user may associate indicator 505 with icon 504, and indicator 505 may be configured to respond to touch by a stylus, finger, cursor, or other interactivity element in order to switch to a different rendering device.

Figure 28:
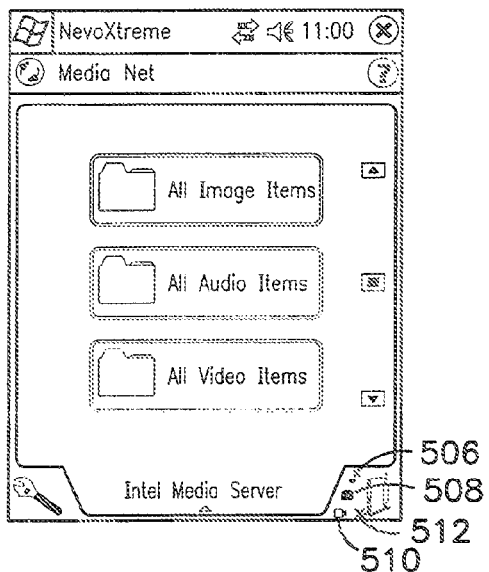
FIGS. 28-30 illustrate exemplary methods for presenting a graphic user interface with exemplary graphical indications of device mode and state.
Figure 29:
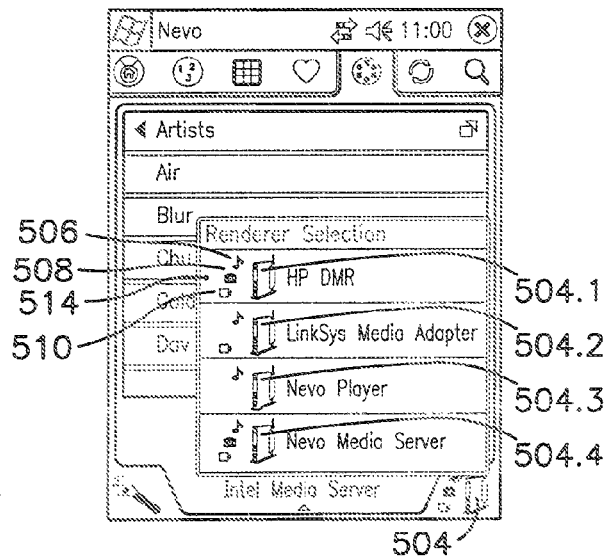

For situations where a selected renderer does not include certain media rendering functions, the icons 506, 508, or 510 may include an additional availability indicator 512 (i.e., an "X" placed next to the icon representing the unavailable media function as shown in FIG. 28) to quickly indicate to a user that a certain media function or functions are not available for the selected renderer. User interaction with the area 500, or on icon 504 may be configured to bring up a list of available renders for selection represented in FIG. 29 by icons 504.1, 504.2, 504.3, and 504.4. Associated with each media renderer icon are various sub-icons 506, 508, and 510 as described above, in this case shown being configured such that only icons representing the available functions of each renderer are displayed. An additional status indicator icon 514 may be used in conjunction with each sub-icon 506, 508, and 510 to indicate the current status of each rendering function of the associated rendering device. For example, icon 514 may represent that the function associated with the icon directly adjacent icon 514 (i.e., sub-icon 508 which represents photo playback functionality in the example shown in FIG. 29) is currently active. In this way a user may be presented a compact visual indication of all available media rendering devices, their associated available functions, and the status of each function.

Figure 30:
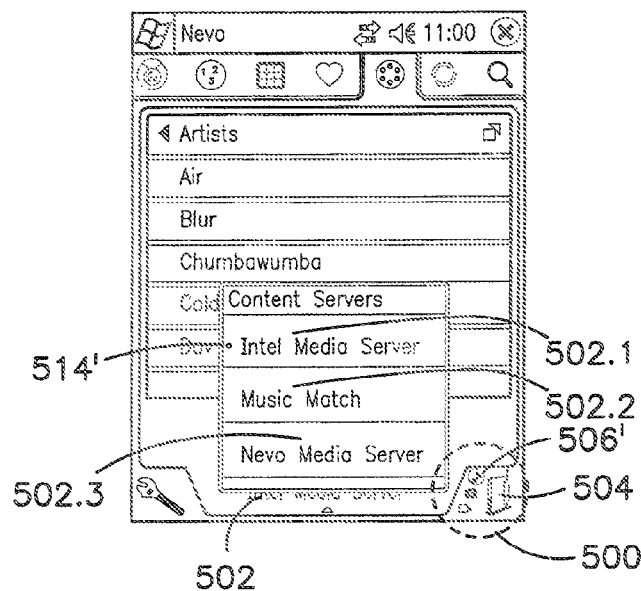

Similarly, as shown in FIG. 30, user interaction with area 502 may be configured to bring up a list of available content servers 502.1, 502.2, and 502.3 for status indication and content selection. Status indicator icon 514' may be used to indicate that the server directly adjacent icon 514' (i.e., server 502.1 in the example shown in FIG. 30) is currently active. Although not shown in FIG. 30, additional sub-icon similar to icons 506, 508, and 510 may be used in conjunction with the display of available content servers to indicate the types of content available on each content server. When used in conjunction with area 500, an indication of the renderer (icon 504) being used for the playback of media from the selected content server 502.1 may be displayed, as well as the status of content playback via sub-icons (i.e. icon 506').

It will be appreciated that these concepts may be extended across multiple areas of the display surface in order to simultaneously present the status of both a server and a rendering device. For example, the space shown occupied by the setup "wrench" icon 520 could in certain circumstances be replaced by a display element similar to area 500, allowing simultaneous presentation of the capabilities of both a server and a rendering device using similar visual elements. In this instance it will be understood that in addition to the touch inputs previously described, switching and routing of media streams, and rendering devices may also be accomplished by dragging a stylus, finger, cursor, etc., from one of the sub-icons of a server representation into a renderer representation, and vice-versa. It will be further understood and appreciated that the size, placement on a particular user interface or electronic device, shading, coloring, and other "look and feel" elements of the described icons and indicators of the current invention may vary widely without departing from the spirit and scope of the current invention.

The system and process of the present invention has been described above via the use of illustrative graphical user interface elements and designs. It is understood that unless otherwise stated to the contrary herein, the functions and methods by which these are generated and rendered may be integrated in a single physical device or a software module in a software product, or may be implemented in separate physical devices or software modules, without departing from the scope and spirit of the present invention.

It is to be appreciated that detailed discussion of the actual implementation of each graphical display element and user interface method is not necessary for an enabling understanding of the invention. The actual implementation is well within the routine skill of a programmer and system engineer, given the disclosure herein of the system attributes, functionality, and inter-relationship of the various elements in the system. A person skilled in the art, applying ordinary skill can practice the present invention without undue experimentation.

While the invention has been described with respect to various illustrative examples, it will be apparent to those skilled in the art that various modifications and improvements may be made without departing from the scope and spirit of the invention. Accordingly, it is to be understood that the invention is not to be limited by these specifically illustrated examples.

All of the cited references are incorporated herein by reference in their entirety

What is claimed is:

1. A non-transitory, computer-readable media having stored thereon instructions which, when executed by a smart device, cause the smart device to perform steps comprising:

causing a content access interface to be displayed in a touch sensitive display of the smart device, the content access interface having a plurality of media interface elements wherein each of the plurality of media interface elements is representative of a media content that is accessible via use of a first controllable appliance and each of the plurality of media interface elements is selectable by a user to cause the smart device to transmit a command to cause the first controllable appliance to access the media content corresponding to the selected one of the plurality of media interface elements; and in response to the user interacting with an interactivity element displayed in the touch sensitive display, causing a first plurality of control interface elements to be temporarily added to the content access interface together with one or more of the plurality of media interface elements, wherein each of the first plurality of control interface elements is representative of volume operational function of a second controllable appliance and each of the first plurality of control interface elements is selectable by the user to cause the smart device to transmit a command to cause the second controllable appliance to perform a volume control function corresponding to the selected one of the first plurality of control interface elements.

2. The non-transitory, computer-readable media as recited in claim 1, wherein the first and second controllable appliances are the same controllable appliance.

3. The non-transitory, computer readable media as recited in claim 1, wherein, in response to the user interacting with the interactivity element displayed in the touch sensitive display, the instructions also cause a second plurality of control interface elements to be temporarily added to the content access interface together with the first plurality of control interface elements and the one or more of the plurality of media interface elements, wherein each of the second plurality of control interface elements is representative of transport operational function of the first controllable appliance and each of the second plurality of control interface elements is selectable by the user to cause the smart device to transmit a command to cause the first controllable appliance to perform a transport control function corresponding to the selected one of the second plurality of control interface elements.

4. The non-transitory, computer readable media as recited in claim 3, wherein the first and second controllable appliances are the same controllable appliance.

5. The non-transitory, computer readable media as recited in claim 1, wherein the first plurality of control interface elements are temporarily added to the content access user interface until such time as the instructions sense a subsequent user interaction with the interactivity element displayed in the touch sensitive display.

6. The non-transitory, computer readable media as recited in claim 1, wherein the control interactivity element comprises an element that is intended to be dragged across the touch sensitive display.

7. The non-transitory, computer readable media as recited in claim 1, wherein the first plurality of control interface elements are caused to be displayed in a discrete interface relative to the one or more of the plurality of media interface elements.

8. The non-transitory, computer readable media as recited in claim 1, wherein the first plurality of control interface elements are caused to be displayed in a continuous interface with the one or more of the plurality of media interface elements.

9. The non-transitory, computer readable media as recited in claim 1, wherein the plurality of media interface elements comprises at least a title of the corresponding media content.

10. The non-transitory, computer readable media as recited in claim 3, wherein the first and second plurality of control interface elements are temporarily added to the content access user interface until such time as the instructions sense a subsequent user interaction with the interactivity element displayed in the touch sensitive display.

11. The non-transitory, computer readable media as recited in claim 3, wherein the control interactivity element comprises an element that is intended to be dragged across the touch sensitive display.

12. The non-transitory, computer readable media as recited in claim 3, wherein the first and second plurality of control interface elements are caused to be displayed in a discrete interface relative to the one or more of the plurality of media interface elements.

13. The non-transitory, computer readable media as recited in claim 3, wherein the first and second plurality of control interface elements are caused to be displayed in a continuous interface with the one or more of the plurality of media interface elements.

14. The non-transitory, computer readable media as recited in claim 3, wherein the plurality of media interface elements comprises at least a title of the corresponding media content.

15. The non-transitory, computer readable media as recited in claim 1, wherein the instructions cause the smart device to access a remotely located server device to retrieve information for creating the plurality of media interface elements.

16. The non-transitory, computer readable media as recited in claim 3, wherein the instructions cause the smart device to access a remotely located server device to retrieve information for creating the plurality of media interface elements.

* * * * *